United States Patent Office 2,936,301
Patented May 10, 1960

2,936,301

POLYTETRAFLUOROETHYLENE GRANULAR POWDERS

Paul Elliot Thomas, Wilmington, and Curtis Clayton Wallace, Jr., Newark, Del., assignors to E. I. du Pont de Nemours and Company, Wilmington, Del., a corporation of Delaware No Drawing. Application November 15, 1956
Serial No. 622,253

3 Claims. (Cl. 260—92.1)

This invention relates to polytetrafluoroethylene resin and more particularly to an improved polytetrafluoroethylene granular powder having, among other desirable features, special suitability for molding into thin non-porous sheeting.

The usual steps involved in molding articles of polytetrafluoroethylene granular powder include (1) loading and leveling the powder in a die, (2) compressing the powder in the die to obtain an adequately dense preform, (3) removing the preform to a sintering oven and (4) sintering the preform to cause coalescence of the preformed powder particles by first heating to temperatures above 327° C. and then cooling, either free or in a cooling die.

The application of these methods to the manufacture of thin non-porous sheeting with conventional granular powders has, however, been quite difficult and expensive. Non-porous sheeting of polytetrafluoroethylene, 10 to 125 mils thick, is especially suitable for use as heat-resistant, chemical-resistant, non-fouling, anti-friction insulation or covering for electrical equipment, food and chemical process equipment, marine hulls, and the like. For many such uses, it is also necessary that the sheeting be strong and tough. Usual requirements for strong tough non-porous sheeting are tensile strength at least 2500 p.s.i. (ASTM D–412 die C), flex life at least $10^5$ cycles (45 cycles/min. 180° bend at room temperature), freedom from pinholes as judged by high voltage spark test, with a short time dielectric strength uniformly above 400 volts per mil (via ASTM D–149–49T in Primol D), and a $CO_2$ permeability rate not greater than $1 \times 10^{-13}$ moles-cm./cm.$^2$/sec./cm. Hg. pressure at room temperature.

In achieving these requirements with conventional polytetrafluoroethylene granular powders, difficulty has been experienced initially in loading and leveling the powder in the die with sufficient uniformity to permit compression of the charge to a flawless, adequately dense preform, particularly where final sheets thinner than about 60 mils or larger than about four square feet were desired. Secondly, even with the most carefully loaded and leveled charges, preforming pressures of at least 2000 p.s.i.g. have ordinarily been necessary to achieve adequate uniform preform density, and accordingly expensive special presses have been needed for the manufacture of larger sheets. Thirdly, difficulties have been encountered, even with flawless preforms of adequate uniform density, due to their fragility, and the frequency of rejects has been high due to the development during their transfer to the sintering oven, of cracks and flaws which would not heal in the sintering operation. Finally, even with perfect preforms, very long heating and cooling cycles have frequently been necessary in order to achieve the requisite resistance to permeation in the final article.

It has previously been known to improve the levelability of polytetrafluoroethylene granular powder by comminuting it to finely divided form (see McKinley British Patent 638,328). It has also been known to improve the strength of unsintered objects made of polytetrafluoroethylene granular powder by preliminarily shearing the powder (see Llewellyn U.S. Patent 2,578,523). Hitherto however, if sufficient shear stresses have been applied to the powder to improve the strength of preforms molded from it, it has either been impossible to level the product with sufficient uniformity to produce a preform of adequate uniform density in thin sections, or else it has been impossible to cause the sheared powder particles to coalesce to soundly fused articles during the sintering operation. Consequently, it has not hitherto been known to prepare a powder which is readily leveled and preformed, and, at the same time, capable of yielding strong readily handled preforms which, in turn, are capable of being sintered to thin strong tough non-porous sheeting. For these reasons, it has hitherto been impractical to mold sheeting in thicknesses of less than about 60 mils in sizes larger than about four square feet.

Strong, tough, non-porous sheeting of about 30 mils thickness is adequate in total strength, flex life and permeability for most applications, and is therefore, preferred to the thicker sheets. Since tedious and expensive procedures are ordinarily involved in suitably bonding sintered sheets of the resin together, there is considerable demand for the larger sheets.

It is a general object of the present invention to provide an improved polytetrafluoroethylene granular powder. A more particular object is to provide polytetrafluoroethylene granular powder adapted for use as a sheet molding composition. It is especially an object to provide a polytetrafluoroethylene granular powder which is readily loaded, leveled, compressed, handled and sintered to strong tough non-porous sheeting as thin as 25 mils and as large as 16 square feet or more. In another aspect, it is an object of the present invention to provide an improved process for the manufacture of large, thin, strong, tough non-porous sheeting of polyteterafluoroethylene. Other objects will be apparent hereinafter.

According to the present invention, it has been found that the aforesaid objects are achieved by polytetrafluoroethylene granular powder having an air-permeability sub-sieve size of less than 5 microns, a wet-sieve size of less than 50 microns with less than six weight percent retained on a 230 mesh screen, and a shape factor of 5 to 12, as hereinafter defined. The novel powders have a low apparent (bulk) density, in the range of 100–300, preferably 150–200 grams per liter. As seen under the microscope, they consist of small discrete relatively non-porous particles, a substantial number of which are in fibrous form. In addition to the above characteristics, and the ease with which they may be loaded, leveled, preformed, handled and sintered, they manifest high anisotropic expansion when preformed and sintered, having an anisotropic expansion factor, as hereinafter defined, of 1.16 to 1.28, which is apparently a consequence of the high proportion of microfibrous particles they contain.

The term "polytetrafluoroethylene granular powder" is used herein in the conventional sense to refer to polytetrafluoroethylene resin in the form of rough irregular particles of supercolloidal size, having a total surface area of from 1 to 4 square meters per gram as measured by nitrogen adsorption (for example by the method described in Chapter XII of "Scientific and Industrial Glass Blowing and Laboratory Techniques," by W. E. Barr and Victor J. Anhorn, published in 1949 by Instruments Publishing Company). This value corresponds to a theoretical average particle diameter of 0.67 to 2.67 microns on the assumption that all particles are spherical. Such powders may be obtained by contacting tetrafluoroethylene in the absence of organic additives with an agitated aqueous solution of an inorganic peroxide catalyst, as described, for example, in Brubaker U.S. Patent 2,393,967, and are ordinarily employed in molding operations. They are to be distinguished from the "fine powders" obtainable by the coagulation of aqueous dispersions of colloidal polytetrafluoroethylene, which have a much higher total surface area, and are not suited for general molding applications.

The term "air-permeability sub-sieve size" as used herein, refers to the calculated specific surface particle diameter ($d_{ss}$) as determined via the air permeability method using, for example, the "Subsieve Sizer," catalog number 14–312 of the Fisher Scientific Company, or the procedure of H. J. Kamack described in "Analytical Chemistry," volume 26, pages 1623–1630 (1954). This method is readily applicable to the relatively non-porous particles of the powder with which the present invention is concerned. The value obtained also corresponds to the theoretical diameter of the average particle, on the assumption that all particles are spherical, but is somewhat easier to measure, and is also more sensitive to compact agglomeration of the powder particles than is the value calculated from nitrogen adsorption measurements.

The term "wet-sieve size," as used herein, refers to a measured-sieve-size particle diameter ($d_{ws}$) obtained by actually sieving the particles. In obtaining this value, equipment comprises U.S. Standard sieves, 8 inches in diameter, of 20, 230, 270, 325 and 400 mesh, the last four sieves corresponding to sieve openings of 62, 53, 44 and 37 microns, respectively. The 20 mesh sieve is stacked above one of the smaller mesh sieves. A 5 gram sample of powder is placed in the 20 mesh sieve and carefully washed onto the lower sieve by spraying with carbon tetrachloride for about 30 seconds at a rate of about 3 liters per minute, using a shower spray. The spray nozzle is held level with the top of the 20 mesh sieve and moved about in a circular manner, taking care to break up any aggregates and to wash material from the sides of the upper sieve. The upper sieve is then removed and the lower sieve is sprayed in the same way for about four minutes. Finally, the lower sieve is air-dried to constant weight, and the weight of dry powder retained thereon is measured. This series of operations is repeated with a fresh 5 gram sample of powder on each of the other three small-mesh sieves. The weight of powder retained on each is multiplied by 20 to obtain cumulative weight percentage figures, which are then plotted against sieve-opening size on log probability paper. The best straight line is drawn through these points, and the particles sizes corresponding to cumulative percentages of 50 ($\bar{d}_{50}$) and 84 ($\bar{d}_{84}$) are read off. From these particle sizes the value $d_{ws}$ is calculated from the equation $$\log_e d_{ws} = \log_e \bar{d}_{50} - \frac{1}{2}\left(\log_e \frac{\bar{d}_{84}}{\bar{d}_{50}}\right)^2$$

This value thus corresponds to a measured diameter of the average particle, on the assumption that all particles are spherical.

The term "shape factor," as used herein, refers to the ratio R where $$R = \frac{d_{ws}}{d_{ss}}$$

and is thus a measure of the extent to which the average particle departs from the spherical. Hence, a powder having a shape factor of unity would be deemed to consist essentially of spherical particles.

The term "anisotropic expansion factor," as used herein refers to a value determined as follows: Four and one-tenth grams of powder is weighed into a half-inch square rectangular mold cavity and compressed between metal plugs. Pressure is built up to 2000 p.s.i. during one minute, held during two minutes, and then released.

The roughly cubical preform is allowed to stand for 30 minutes. The width, breadth and height of the preform are measured (i.e., the X, Y and Z axes, respectively), where Z is the axis compressed during preforming. The measured preforms are baked 30 minutes at 380° C. ±0.5° C. to obtain a sintered piece, allowed to cool in air to room temperature, and remeasured. Anisotropic expansion factor is then the value of $Z_s/Z_p$ divided by $$\frac{X_s + Y_s}{X_p + Y_p}$$

where X, Y, and Z are the axial measurements, subscripts $p$ and $s$ referring to preform and sintered piece, respectively.

The novel granular powders of the present invention may be conveniently prepared by a process which comprises pulverizing ordinary raw finely-divided polytetrafluoroethylene granular powder by means of an enclosed bladed rotor rotating at peripheral speeds of about 10,000 feet per minute, in a vortex of air or other gaseous medium maintained at temperatures in the range of 19 to 327° C., preferably above 25° C. and below 250° C., wherein, as a result of collision, abrasion, and other disruptive forces there present, the relatively large, heavy discrete, porous particles are disrupted into smaller, lighter, relatively non-porous particles comprising a high proportion of elongated, or fibrous shapes, and then introducing the resultant fluidal stream of the ground particles into a classifier at a temperature not exceeding about 90° C., wherein the desired relatively light small non-porous particles are separated. The proportion of elongated particles depends upon the temperature and upon the total shear stresses induced and their rate of application, and may be controlled by regulating inlet air temperature, the peripheral speed of the rotor blades, the number, design and clearance of the rotor blades, the rate of throughput, and other factors in accordance with principles well understood in the art of fluid grinding in a gaseous medium. Adjustment of the classifier to select suitable fine particles may also be accomplished in accordance with established principles of classifier design and operation. Oversize particles may be recycled to the pulverizer for further grinding. Operation of the grinding step within the prescribed temperature ranges is necessary, since at temperatures below 19° C. or above 327° C., the polytetrafluorethylene powders exist in physical states such that they are not amenable to the disruption into the small sized elongated particles characteristic of the powders of the present invention. Within this range, the tendency to form fibers increases with temperature. In classifier operation, temperatures above 90° C. tend to cause agglomeration of the ground particles, and thus to interfere with proper classification.

Apparatus especially suitable for grinding and classifying to obtain the novel powders of the present invention is commercially available under the name "Hurricane Mill" as a product of the Microcylomat Company of Minneapolis, Minnesota.

In one preferred preparative process, a commercial grade of unsintered polytetrafluoroethylene granular molding powder having an apparent (bulk) density of about 500 grams per liter and a wet-sieve size of 300 to 1000 microns is pulverized and classified at ambient grinding temperatures in the range of about 25 to 250° C. and classifier temperatures maintained below 90° C., in a V–18 "Hurricane Mill." The combined apparatus comprises a vertically motor driven rotor shaft positioned at the axis of a cylindrical housing 18 inches in diameter, the lower two-thirds of which houses five superposed grinding stages partially separated by horizontal discs, each stage containing flat vertically disposed blades mounted radially on a disc extending from the rotor shaft and adapted to clear the confining walls of the housing at least 1/8 and preferably about 1/2 inch, and the upper third of which houses a classifier comprising superposed horizontal centrally apertured discs 1/4 inch thick and 1/4 inch apart mounted on a support extending from the rotor shaft, the stacked discs being surmounted in turn by (a) coarse particle entraining dispersing and recycling fan means comprising vertically disposed vanes mounted on the top classifier disc at an angle to its radius, (b) a plenum chamber partially separated from said fan means a by a stationary disc extending inwardly from the housing, and communicating with an air intake in the housing wall, and (c) fine particle entraining dispersing and discharging fan means similar to but of greater capacity than fan means a, the vertically disposed blades being mounted on and dependent from a disc extending from the rotor shaft. In operation, the powder is screw fed to the grinding section at about 50 pounds per hour, with the rotor shaft revolving at about 3600 r.p.m., air entering the plenum chamber at about 1200 cubic feet per minute, and air recycling through the recycle lines and pulverizer at about 250 cubic feet per minute. The powder fed is entrained by the recycle air stream and carried upwardly through the grinding stages to an exit communicating with the space adjacent the external periphery of the classifier plates, where the finer particles are entrained and drawn inwardly between the classifier plates, thence upwardly through the central aperture surrounding the rotor shaft, and finally to discharge through fan means c to a cyclone separator, and the coarser particles are entrained and drawn upwardly and outwardly through the recycle fan means a to return lines, thence back to the lowest grinding stage for further grinding. Adjustments are made to recycle air rate as necessary to maintain adequate pneumatic conveying back to and through the grinding stages, and powder feed rates are adjusted to maintain power input to the driving motor at 38–40 kw. Discharge air pressure is held below 18 inches of water, classifier air inlet pressure below −2.5 inches of water, and recycle air pressure above −2 inches of water, by means of suitable damper and louvre curtain controls. Discharge temperature is held below 90° C., by forced cooling of inlet air if necessary. The product obtained is a fluffy powder having an apparent (bulk) density of 100–300, preferably 150–200 grams per liter; an air permeability subsieve size of less than 5, preferably 2.8 to 4 microns, a wet-sieve size of less than 50, preferably 20 to 40 microns, with less than 6 weight percent of coarse particles retained on the 230 mesh sieve, and a shape factor of 5 to 12, preferably 8 to 10. The anisotropic expansion factor is 1.16 to 1.28; 1.19 to 1.26 for the preferred powders. Upon microscopic examination at 500 diameters magnification or more the product appears to consist of small irregular relatively non-porous particles, a substantial proportion of which are in the form of short fibers having a length to diameter ratio of 5 or more. Distribution of particle sizes is fairly broad and uniform. The powder is readily fabricated by molding and sintering into flawless nonporous sheets in the thicknesses as low as 25 mils in sizes as large as 48 x 48 inches or more.

In a preferred procedure for making large molded sheets with the new composition, the powder (after being gently sifted through a 6 to 12 mesh screen) is charged into a suitably deep mold cavity defined by a chase closely fitted over a bottom plate supported on a press base. In loading, care is taken to avoid piling in depths markedly greater than the height of the mold cavity. Uniform distribution of the powder is facilitated by its low bulb density, which affords greater working depth of bed. Leveling is accomplished by gentle front-to-back and side-to-side movements of a straight edge supported on the walls of the chase. The leveled charge is covered first with a 2–3 mil thick layer of film or foil, e.g., of polyethylene terephthalate, polyethylene or aluminum, then with an elastic pressure distribution sheet, e.g., natural gum rubber, 1/8 inch thick, of Shore hardness A-32, and Shore elasticity 88, cut to fit inside the mold cavity with about 1/16 inch clearance on all sides, and finally with a top plate of metal. Pressure is then built up gradually during about 2 minutes and held during about 1 minute. Because of the greater coalescibility of the new powders, a preform of density as low as 1.81 can be sintered to the final density of at least 2.14, which is the minimum for non-porous sheeting. Such preform densities can be achieved at preforming pressures of as low as 500 pounds per square inch, with the new powders. Compensation for minor loading and leveling errors can be made by using higher preforming pressures, up to about 4000 pounds per square inch, but pressures above 4000 should not be used since they tend to give rise to the development of unhealable shear faults in the preform. Pressures of about 1000 pounds per square inch are preferred. In contrast, conventional powders must be compressed to a density of at least 2.00 in order to be capable of sintering to densities as high as 2.14 and therefore, ordinarily require preforming pressures of at least 2000 pounds per square inch. The effect of preforming pressure and preform density on final density is illustrated in the following table for conventional granular molding powder and the new fluid-ground powder made from it according to the teachings of the present invention. The comparisons are based on 4 x 5 x 1/16 inch sheets, sintered 60 minutes at 370° C. and cooled to room temperature at 4° C. per minute.

Table I

| Preforming Pressure, p.s.i. | | Preform Density, g./CM.$^3$ | | Sintered Density, g./CM.$^3$ | |
|---|---|---|---|---|---|
| Conventional | New | Conventional | New | Conventional | New |
| 600 | 500 | 1.60 | 1.81 | 1.88 | 2.17 |
| 1,000 | 1,000 | 1.77 | 1.92 | 2.00 | 2.17 |
| 2,000 | 2,000 | 2.00 | 2.04 | 2.14 | 2.17 |
| 4,000 | 4,000 | 2.15 | 2.15 | 2.15 | 2.17 |

Thus, with given press equipment, the new powder makes it possible to produce sheeting two to four times as large as was possible with conventional powders. In addition, preforms made of the new powders at 1000 pounds per square inch are roughly three times as strong as preforms made of conventional powders at 2000 pounds per square inch, and hence are much more readily handled. For example, a 48 x 48 x 1/16 inch preform can be bowed 18 inches without developing cracks, whereas a similar preform of conventional powder cracks so as to yield a flawed sintered article when bowed 2 to 3 inches.

Choice of sintering and cooling conditions depends upon thickness, and upon the properties it is desired to emphasize in the final product. For high strength and toughness, preferred conditions for 25–60 mil sheeting involve sintering the preforms on flat plates at 380–390° C. for 60 minutes and then transferring them to a press where they are "coined" and cooled between cold plates under a pressure of about 1000 pounds per square inch. For high resistance to permeation, preferred conditions for 25–60 mil sheeting involve sintering at 400° C. for 90 minutes, cooling rapidly to 340° C., further cooling from 340° C. to below 300° C. at less than 2° C. per minute, and further cooling to room temperature at any convenient rate while maintaining a uniform environmental temperature to avoid uneven contraction. Typical properties of 48 x 48 x 1/32–1/16 inch sheeting made via these coining and slow cooling procedures are shown in the following table. Test methods and units are those previously described.

Test II

| | Coined | Slow Cooled |
|---|---|---|
| Density | 2.14 | 2.18 |
| Tensile Strength | 4,500 | 3,900 |
| Flex Life | 3×10$^6$ | 10$^5$ |
| Dielectric Strength | 610 [1] | 610 [1] |
| $CO_2$ Permeability | 1×10$^{-13}$ | 3×10$^{-14}$ |

[1] No value below 400.

The new powders are not only sinterable into non-porous sheeting in shorter times than conventional powders, but also may be sintered into higher quality sheeting than could previously be produced, as indicated in the following table, which compares the properties of sheeting obtained from the new powder and conventional powder under identical fabrication conditions. In the table, results are shown for 4 x 5 x 1/16 inch sheets, preformed at 2000 p.s.i., sintered at 375° C. for 90 minutes, and cooled at 2° C. per minute. Test methods and units are those previously described.

*Table III*

|  | Conventional Powder | New Powder |
|---|---|---|
| Density | 2.17 | 2.18. |
| Tensile Strength | 2,700 | 4,400. |
| Dielectric Strength | 425 | 625. |
| N₂ Permeability | 1×10⁻¹³ | 3×10⁻¹⁴. |
| Flex Life | 4×10⁴ | 5×10⁶. |

The present invention thus provides for the first time a polytetrafluoroethylene granular powder which can be readily loaded, leveled and compressed at low pressure to yield preforms of markedly improved strength and handleability which, in turn, can be readily sintered into large thin non-porous sheeting. In achieving these advantages, each of the several hereinbefore recited features is critical, as illustrated in the following table which compares polytetrafluoroethylene granular powder in a variety of forms with the powders of the present invention, and as explained in the following discussion.

In the table, powder A is a commercial grade of polytetrafluoroethylene granular powder. All other powders are prepared from powder A. Powder B is obtained by hammer milling powder A in a "Mikropulvizer." Powder C is a conventional sheet molding powder obtained by subjecting a water slurry of powder A to the action of high speed cutting blades, rotating at a peripheral velocity of about 5000 feet per minute. Powder D is obtained by subjecting an alcohol slurry of powder A to the treatment of powder C. Powder E is a product obtained by mechanically shredding powder A between closely spaced rolls operated at different speeds, and then water cutting as with powder C. Powder F is a product obtained by chilling Powder A to liquid nitrogen temperature, and then subjecting it to dry, high speed rotary blade cutting. Powder G is a product obtained by subjecting powder A to the disrupting action of high velocity gas jets in a "Micronizer." Powder H is the product of the present invention.

thickness of less than about ½ inch, though it does yield stronger preforms. Product E yields strong preforms, but cannot be sintered into non-porous sheeting because the shredded particles do not coalesce on sintering. Powder G can be readily leveled and compressed, but yields fragile preforms.

In general, even with products otherwise meeting the specifications of the powders of the present invention, high preforming pressures are required if the product is found to contain more than 6 weight percent of coarse particles retained on the 230 mesh sieve in the wet sieve test. Moreover, if the shear stresses applied during the preparation stage are too high, so that the powder manifests a shape factor higher than 12 or an anisotropic expansion factor greater than 1.28, the coalescibility of the powder is adversely affected, and the advantages of the present invention are not achieved.

In addition to their particular suitability for the manufacture of thin molded sheeting, the powders of the present invention may also be used to advantage in general purpose molding, for example, in the manufacture of cylinders for shaved tape production via the process of Alfthan U.S. Patent 2,406,127, with minor modifications to take account of their lower apparent (bulk) density and lower preforming pressure requirement. Thus in loading a tape cylinder mold, temporary tubular extensions may be used to accommodate the greater bulk of the new powder in existing tape cylinder molds. The weight of the end plate is then generally enough to compress the powder down into the mold proper, so that the temporary extension can be discarded. Preforming pressure is built up at mold closing rates of about 1 inch per minute, about half the usual rate, to allow greater time for entrapped air to escape, and somewhat lower maximum preforming pressure of 2000 pounds per square inch is employed. Sintering is carreid out in the usual way, and a cooling and coining pressure of about 1000 pounds per square inch is used. High quality tape of 1 mil thickness can be shaved from the resulting cylinders as contrasted with the 2 mil minimum usually feasible. The short time dielectric strength of typical 5 mil tape, as shaved from such cylinders, is 2240 volts per mil via ASTM D–149–49 T and its tensile strength is 5420 pounds per square inch in the machine direction and 4380 pounds per square inch in the transverse direction.

In some molding applications, the feeding characteristics of the new powders can be improved by pelletizing. The pelletizing may be accomplished by tumbling the powder through a rotating smooth-surfaced tube heated to 100–300° C. and inclined so as to afford a heating time of 2 to 10 seconds.

The new powders may also be calendered by conven-

| Powder | N₂ Adsorption Surface Area M²/g. | Air Permeability Subsieve Size Microns | Wet Sieve Size Microns | Shape factor | Expansion factor | Remarks |
|---|---|---|---|---|---|---|
| A | 1–4 | (a) | >700 |  | 1.10 | Porous particles. |
| B | 1–4 | (a) | >100 |  | 1.14 | Do. |
| C | 1–4 | (a) | >300 |  | 1.10 | Do. |
| D | 1–4 | (a) | >70 |  | 1.11 | Do. |
| E | 1–4 | (a) | >1,000 |  | >1.28 | Do. |
| F | 1–4 | >5 | 40–240 | (b) | 1.11 |  |
| G | 1–4 | <5 | <50 | <5 | 1.10 |  |
| H | 1–4 | <5 | <50 | 5–12 | 1.16–1.28 |  | a Air permeability sub-sieve size not applicable to porous particles.
b Shape factor not applicable to powders of air permeability sub-sieve size greater than 5 microns.

Thus, it can be seen that each of the above powders differs in at least one essential characteristic from the powders of the present invention. Products A, C, D, E and F can be leveled with some difficulty, but require high preforming pressures and yield fragile preforms. Product B cannot be loaded and leveled with adequate uniformity for the preparation of non-porous sheeting in tional techniques, preferably using large diameter rubber covered calender rolls heated to about 80° C. In general, however, the quality of sheeting prepared by calendering the new powders is inferior to that of sheeting obtained by the preferred molding process hereinbefore described.

Pigments and fillers may be dispersed in the new powders if desired, by tumbling to yield mixtures which can readily be converted to highly-uniform products by performing and sintering. Other advantages of the novel powders will be readily apparent to those skilled in the art.

We claim:

1. Polytetrafluoroethylene granular powder suitable for fabrication by leveling compressing and sintering into non-porous polytetrafluoroethylene sheeting less than 0.5 inch thick, said powder being one containing a substantial proportion of fibrous polytetrafluoroethylene particles and having an air-permeability sub-sieve size of less than 5 microns, a wet-sieve size of less than 50 microns with less than 6 weight percent retention on a standard 230 mesh sieve, a ratio of wet-sieve size to air-permeability sub-sieve size in the range of 5 to 12, and exhibiting anisotropic expansion, upon being vertically compressed into a ½ inch cube and sintered, such that as between dimensions of said cube 30 minutes after compressing under 2000 p.s.i. and dimensions of said cube after thereafter sintering at 380° C. for 30 minutes and cooling to room temperature, the proportional increase in vertical axial dimension is 1.16 to 1.28 times the proportional increase in the sum of the horizontal axial dimensions.

2. Polytetrafluoroethylene granular powder, suitable for fabrication by leveling, compressing at less than 2000 p.s.i. and sintering into non-porous polytetrafluoroethylene sheeting less than 0.5 inch thick, said powder containing a substantial proportion of fibrous polytetrafluoroethylene particles and having an air-permeability sub-sieve size of 2.8 to 4 microns, a wet-sieve size of 20 to 40 microns with less than 6 weight percent retention on a standard 230 mesh sieve, a ratio of wet-sieve size to air-permeability sub-sieve size in the range of 8 to 12, and exhibiting anisotropic expansion, upon being vertically compressed into a ½ inch cube and sintered, such that as between dimensions 30 minutes after compressing under 2000 p.s.i. and dimensions after thereafter sintering at 380° C. for 30 minutes and cooling to room temperature, the proportional increase in vertical axial dimension is 1.19 to 1.26 times the proportional increase in the sum of the horizontal axial dimensions.

3. In a process for the manufacture of shaped articles by preforming and sintering polytetrafluoroethylene granular powder, the steps of preliminarily entraining porous isotropic polytetrafluoroethylene granular powder in a gaseous medium, disrupting and shearing the entrained powder, at a temperature in the range of 19 to 327° C., by means of an enclosed multibladed pulverizer having blades rotating at peripheral speeds on the order of 10,000 feet per minute, into non-porous anisotropic particles having a theoretical average particle size of less than 5 microns, as determined by air-permeability, and an apparent average particle size, as determined by wet-sieve analysis, which is less than 50 microns and 5 to 12 times said theoretical average particle size, and separating from the resulting fluidal stream, at a temperature not exceeding 90° C., by means of a flat-plate classifier, a powder of said particles which powder contains less than 6 weight percent of particles retained on a standard 230 mesh sieve on wet-sieve analysis, and exhibits anisotropic expansion, upon being vertically compressed into a ½ inch cube and sintered, such that as between dimensions of said cube 30 minutes after compressing under 2000 p.s.i. and dimensions of said cube after thereafter sintering at 380° C. for 30 minutes and cooling to room temperature, the proportional increase in vertical axial dimension is 1.16 to 1.28 times the proportional increase in the sum of the horizontal axial dimensions.

References Cited in the file of this patent

UNITED STATES PATENTS

| | | |
|---|---|---|
| 2,393,967 | Brubaker | Feb. 5, 1946 |
| 2,400,099 | Brubaker et al. | May 14, 1946 |
| 2,406,127 | Alfthan | Aug. 20, 1946 |
| 2,717,741 | Lykken | Sept. 13, 1955 |